Patented Oct. 6, 1931

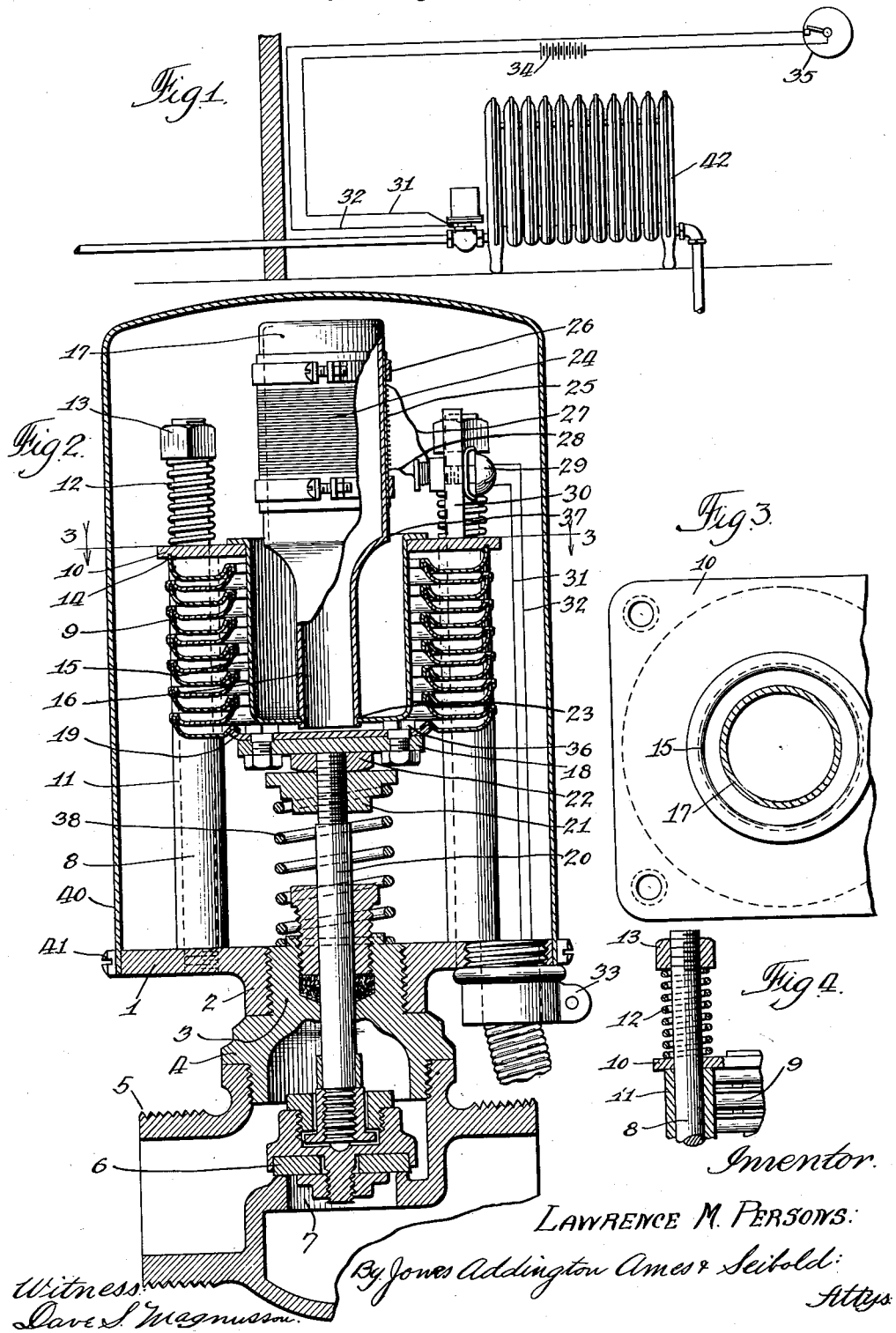
Oct. 6, 1931. L. M. PERSONS 1,826,151
THERMOELECTRIC CONTROL VALVE
Filed Aug. 16, 1927
Inventor.
LAWRENCE M. PERSONS.
By Jones Addington Ames & Seibold
Attys.

1,826,151

UNITED STATES PATENT OFFICE

LAWRENCE M. PERSONS, OF CHICAGO, ILLINOIS, ASSIGNOR TO COOK ELECTRIC COMPANY, OF CHICAGO, ILLINOIS, A CORPORATION OF ILLINOIS

THERMOELECTRIC CONTROL VALVE

Application filed August 16, 1927. Serial No. 213,305.

My invention broadly relates to temperature controlling devices.

More specifically, my invention relates to an electro-thermostatic device for operating valves, dampers, or the like, of heating systems, whereby to regulate the temperature by means of the usual circuit thermostat.

The use of circuit breakers whereby to limit the expansion and prevent rupture of the thermal element has heretofore been inherent in the design of thermally actuated temperature controlling devices. However, circuit breakers in such devices have caused considerable annoyance, due to the frequent failure of the operating parts to actuate at the proper time and the sticking and rapid burning of the contact members.

Without the use of a circuit breaker, no means would be provided to check the continued expansion of the thermally controlled element under a continuously closed circuit. It is an impractical consideration to predetermine the volume of volatile fluid customarily employed in the thermal element to obtain limited expansion, inasmuch as the volatile fluid under the influence of continuous heat may have varying limits of expansion. Radiation and other factors will invariably alter the limit of expansion, thereby rendering it impossible in practice to obtain a fixed limit of expansion of a given body of volatile fluid in each particular case.

On the other hand, the stroke of the valve or other element to be actuated is apt to alter or vary at times. In different adaptations, the working movements of these parts will be different and to obtain the exact movement on the part of the thermal element so as to impart the necessary motion each time is indeed a difficult manufacturing problem. The only solution of this problem has been by the use of circuit breakers which open the circuit after the necessary motion has been imparted.

Broadly, it is an object of my invention to provide a temperature controlling device of the electro-thermostatic type permitting the elimination of circuit breakers, by arranging the thermal element to operate within a predetermined limit of expansion under closed circuit conditions, thereby controlling the expansion of the thermal element without necessarily opening the circuit.

My invention may be uniquely adapted to heating systems requiring operation of valves or other controlled members having different ranges of movement. I contemplate providing means allowing this predetermined limit of expansion to vary within a certain range and to compensate for any difference in the pressure developed above that which is required to furnish the operating movement whereby to eliminate the possibility of the application of excess pressure and the resultant wear and rupturing of the structure. Such compensating means also permits adaptation of the electro-thermostatic device to different installations without requiring the movement of the thermal element accurately to correspond to the stroke of the valve, or other member actuated.

It may be mentioned that my invention in its broader aspects provides a thermal element capable of expending its movement in different directions, or balancing its pressure until a predetermined force is exerted in one direction and thereafter yielding to any further pressure that may develop, to prevent the application of excess pressure against the element it operates.

Other objects and advantages of the present invention will be apparent from the following detailed description taken in connection with the accompanying drawings:

Figure 1 illustrates diagrammatically a heating system embodying an electro-thermostatic device for regulating the temperature of an individual room;

Fig. 2 is an enlarged vertical sectional view of the electro-thermostatic device;

Fig. 3 is a sectional view taken on line 3—3 with the right hand portion of the view broken away; and Fig. 4 is a detailed sectional view.

Although my invention may be embodied in different forms of apparatus, the device shown in the drawings comprises a base 1 having an internally threaded boss 2 adapted to receive a threaded stud 3 extending from cap 4 of a valve structure 5. Any type of valve gate 6 may be employed for the valve seat 7.

A rigid frame comprising corner posts 8 is supported on base 1 for supporting a contractible and expansible vessel 9, which may be in the form of a bellows of any suitable construction and material. The lower ends of corner posts 8 are threaded to base 1. A plate 10 is perforated at its corners to allow the posts to pass therethrough, so that the plate may be slid downwardly over these posts and rest against suitable abutments, such for instance as the upper ends of sleeves 11, which may extend upwardly about the post from base 1. Normally, the plate 10 is held against the upper end of sleeves 11 by a plurality of compression springs 12 held between the plate and the nuts 13. The tension of springs 12 may be adjusted by turning the nuts 13 in either direction. One end of bellows 9 is suitably secured at 14 to end plate 10. The central portion of end plate 10 is apertured to receive a cup 15, which extends downwardly into bellows 9 for receiving neck 16 of a heating tube 17.

The lower portion of bellows 9 is closed off by a plate 19, to which is secured a disc 18 by the bolts 36. Disc 18 is adapted to abut against the upper end of a valve stem 20 carrying gate 6. Stem 20 is threaded at its upper end to receive an adjusting nut 21 and a lock nut 22.

As illustrated in Fig. 2, a heat coil 24 is carried by a sleeve 25 of suitable insulation, which is held in position on tube 17 by a pair of clamping bands 26. Leads 27 and 28 connecting to heat coil 24 are connected to a pair of terminals 29 carried on a block of insulation 30, which block of insulation may be supported upon end plate 10. Conductors 31 and 32 leading from terminals 29 may extend downwardly through a conduit connection 33 suitably attached to base 1.

Conductors 31 and 32 may include in circuit any suitable source of current supply 34 and a thermostat 35.

Thermostat 35 may comprise the usual room thermostat, which is adapted to close upon a rise of temperature in the room so as to permit a flow of current through heat coil 24. A volatile substance is provided for the interior of tube 17 and is adapted to be driven into bellows 9 upon development of heat at heat coil 24. Upon entering bellows 9 the volatile substance will expand the bellows and initially move the lower end downwardly, and, in turn, move valve stem 20 downwardly so as to close gate 6. If the room temperature lowers beyond a predetermined point, the thermostat opens the circuit to discontinue the flow of current through the heat coil 24 thereby permitting the volatile substance to return into tube 17. Either inherent resiliency of bellows 9, or the upward movement of gate 6 from its seat, by the action of a coil spring 38 surrounding valve stem 20 will return the bellows to its normally contracted position.

Tube 17 and neck 16 are preferably of different materials. Heat is conducted through the tube to the volatile substance therein to cause it to expand and be driven through the neck into bellows 9. The conduction of heat to bellows 9 is checked by means of neck 16, which may be of smaller cross sectional area and of material of lower heat conductivity. Of the different kinds of material that may be used, I desire to mention that tube 17 may be of brass, while the neck 16 may be of steel. The brass, being of greater conductivity, will permit the heat to expand the volatile fluid as long as it is within this tube, but further conduction of heat is checked at the point 37 where the steel neck is secured to the lower end of tube 17. After the volatile fluid is driven into bellows 9, I find that further expanding action of the bellows is substantially checked. This is due to two reasons; first, the neck 16 is of a different material than the tube 17, and consequently, the heat is not conducted as rapidly, and second, the cross sectional area of neck 16 is substantially smaller than that of tube 17. Moreover, the experiments which I have conducted, have shown that the conduction of heat may be checked to a satisfactory degree at the point 37 when the neck is of a smaller cross sectional area only and when the material is of the same or different heat conductivity. On the other hand, I find that the same result can be accomplished when the cross sectional area of the neck is disregarded and the material is of a predetermined heat conductivity, preferably lower, of course, and sufficient to prevent the heat from traveling to bellows 5.

It is thus apparent that the provision of neck 16 restricts conduction of heat to the bellows and eliminates the necessity of a circuit breaker for temporarily interrupting the circuit to prevent an abnormal extension or expansion of bellows 9.

The stroke of the valve stem 20 may vary in different instances, and consequently, in order to eliminate the necessity of accurately predetermining the amount of volatile fluid for reception in tube 17 and bellows 9, I provide the springs 12 to allow the upper end of the bellows to move upwardly after sufficient pressure is developed within the bellows to impart the desired stroke to the lower end thereof. For instance, if the valve is to move a quarter of an inch to its seat, it is possible to permit further expansion of the bellows at the upper end after the lower end expands to seat the valve. The remaining movement occurs at the upper end of the bellows against the tension of springs 12. Thus, it is not necessary to attempt providing the bellows with a fixed predetermined limit of expansion in accordance with the exact stroke desired to operate the valve. The device I have disclosed herein has wide application to devices wherein the movement required of the operating part may vary slightly as the result of manufacturing inaccuracies or for the reason that they are designed to have different movements in their operation.

It is obvious that if the springs were not provided it would be necessary to exactly proportion the amount of volatile substance to the size of the tube, the strength and capacity of the bellows 9 and the current flowing through the heat coil 24. In practice, such determinations are difficult to obtain and, if obtained, would be of little value in view of temperature changes which will alter the stroke or movement of the valve.

Another advantage of the present arrangement resides in the fact that heat coil 24 may be wound to accommodate different voltages so as to permit connecting the circuit in the lighting system of the room if so desired, thereby not requiring a special source of supply for the circuit.

A shell 40 serves as a housing for enclosing the mechanism on base 1. Suitable screws 41 are provided to hold shell 40 in position.

Another advantage resides in the fact that the employing of this device permits the temperature of one room to be regulated independently of the temperature in adjoining rooms in a very simple and inexpensive manner. Each room is provided with a thermostat and one of the electro-thermostatic devices and by the proper setting of the thermostats the electro-thermostatic devices will individually actuate the valves of the radiators 42 in the rooms.

Broadly, I provide a thermal element capable of movement in different directions. In the preferred form shown, after a portion of the movement is expended in one direction, the thermal element continues to move in another direction. I do not desire to be limited, however, to allowing the movement to act in one direction before allowing it to act in another direction. In terms of pressure developed by the thermal element, the arrangement allows exerting pressure in one direction and thereafter exerting continued pressure in another direction. Again, I do not desire to be limited to this exact arrangement.

Other modifications and arrangements may be made by those skilled in the art without departing from my invention.

I claim:

1. A regulator for controlling the operation of a valve including a fitting carried by the body of said valve and having abutments extending therefrom, a plate normally resting on said abutments, spring means for exerting a pressure against said plate, an expansible and contractible vessel hermetically sealed to said plate and having an opposed movable wall abutting against the outer end of the stem of said valve, a volatile fluid in said vessel, and a heating device therefor whereby the initial operation of said vessel moves said wall to operate said valve and subsequent operation exerts a pressure against said plate to overcome said spring pressure.

2. A regulator for controlling the operation of a valve including a fitting carried by the valve body and having rigid uprights thereon, abutments on said uprights, a plate normally resting against said abutments, spring means on the opposite side for exerting a pressure against said plate, a fluid pressure motor including a contractible and expansible wall carried by said plate, said wall engaging the end of the stem of said valve and operating said valve when said motor expands, said spring means yielding to the pressure of said motor whereby to allow said plate to move after said valve is actuated.

3. A heat motor provided with a boiler carried in recessed relation, an electrical heating coil wrapped circumferentially about the exterior of said boiler whereby to vaporize a volatile fluid carried within and thereby to expand said heat motor, the initial expansion of said heat motor moving one end thereof for actuating a control member, and spring means at the opposite end of said heat motor permitting expansion at said opposite end after the control member is actuated.

In witness whereof, I have hereunto subscribed my name.

LAWRENCE M. PERSONS.